(12) United States Patent
Thornton

(10) Patent No.: US 7,069,368 B2
(45) Date of Patent: Jun. 27, 2006

(54) SYSTEM OF CO-LOCATED COMPUTERS IN A FRAMEWORK INCLUDING REMOVABLE FUNCTION MODULES FOR ADDING MODULAR FUNCTIONALITY

(75) Inventor: Barry Thornton, Austin, TX (US)

(73) Assignee: ClearCube Technology, Inc., Austin, TX (US)

( * ) Notice: Subject to any disclaimer, the term of this patent is extended or adjusted under 35 U.S.C. 154(b) by 498 days.

(21) Appl. No.: 09/728,669

(22) Filed: Dec. 1, 2000

(65) Prior Publication Data

US 2004/0225794 A1   Nov. 11, 2004

(51) Int. Cl.
*G06F 13/00* (2006.01)

(52) U.S. Cl. .................. 710/301; 710/100; 710/303

(58) Field of Classification Search ........ 710/301–314, 710/100; 361/686; 711/114; 725/74
See application file for complete search history.

(56) References Cited

U.S. PATENT DOCUMENTS

| | | | |
|---|---|---|---|
| 3,725,866 A | 4/1973 | Oldfield et al. | |
| 4,484,306 A | 11/1984 | Kulczyckyj et al. | |
| 4,688,246 A | 8/1987 | Eilers et al. | |
| 4,885,718 A | 12/1989 | Asprey et al. | |
| 5,130,793 A | 7/1992 | Bordry et al. | |
| 5,150,243 A | 9/1992 | Suzuki | |
| 5,193,200 A | 3/1993 | Asprey et al. | |

(Continued)

FOREIGN PATENT DOCUMENTS

KR   2001106740 A   12/2001

(Continued)

OTHER PUBLICATIONS

PCMCIA Card Developments; Bob Porooshani, Epson America, Inc.*

(Continued)

*Primary Examiner*—Rehana Perveen
*Assistant Examiner*—Kim T. Huynh
(74) *Attorney, Agent, or Firm*—Meyertons Hood Kivlin Kowert & Goetzel, P.C.; Jeffrey C. Hood; Mark S. Williams

(57) ABSTRACT

A system and method for configuring a system in which one or more centrally located computers are coupled to one or more human interfaces (HIs), and in which removable function modules are used to provide additional functionality to the computers. Each computer includes all the elements that make up a standard personal computer, such as a PC motherboard with a microprocessor CPU, memory, and network and interface logic, configured on a single card, and is called a computer card. The system includes a cabinet, or cage, with slots for accepting a plurality of computer cards, and a cage connector which couples to each inserted computer card. A removable function module engages the cage connector via a module connector. The use of the cage connector as an intermediate connection between the computer cards and the function module allows removal and/or exchange of computer cards without the need to disconnect the cables from the cage, as well as removal and/or exchange of the function module without the need to disconnect the computer cards. Each removable function module includes cable connectors corresponding to each computer card slot which may couple to one or more cables for communicating with external systems, such as networks and/or human interface devices, and circuitry which provides additional functionality to the computer cards. Each removable function module may include multiple circuit boards to provide multiple additional functions to the system, such as network processes, switching, routing, analog and digital telephony, video, audio, or other functions.

41 Claims, 9 Drawing Sheets

U.S. PATENT DOCUMENTS

| | | |
|---|---|---|
| 5,257,390 A | 10/1993 | Asprey |
| 5,268,676 A | 12/1993 | Asprey et al. |
| 5,299,306 A | 3/1994 | Asprey |
| 5,311,302 A | 5/1994 | Berry et al. |
| 5,315,711 A | 5/1994 | Barone et al. |
| 5,323,420 A | 6/1994 | Asprey |
| 5,337,413 A | 8/1994 | Lui et al. |
| 5,347,167 A | 9/1994 | Singh |
| 5,353,409 A | 10/1994 | Asprey et al. |
| 5,374,952 A | 12/1994 | Flohr |
| 5,386,574 A | 1/1995 | Asprey |
| 5,428,806 A | 6/1995 | Pocrass |
| 5,465,105 A | 11/1995 | Shatas et al. |
| 5,479,617 A | 12/1995 | Nei |
| 5,499,377 A | 3/1996 | Lee |
| 5,504,540 A | 4/1996 | Shatas |
| 5,550,593 A | 8/1996 | Nakabayashi |
| 5,577,042 A | 11/1996 | McGraw, Sr. et al. |
| 5,577,205 A | 11/1996 | Hwang et al. |
| 5,587,824 A | 12/1996 | Asprey |
| 5,598,401 A | 1/1997 | Blackwell et al. |
| 5,623,304 A | 4/1997 | Ota et al. |
| 5,675,811 A | 10/1997 | Broedner et al. |
| 5,715,410 A | 2/1998 | Kim |
| 5,721,842 A | 2/1998 | Beasley et al. |
| 5,734,834 A | 3/1998 | Yoneyama |
| 5,801,689 A | 9/1998 | Huntsman |
| 5,802,281 A | 9/1998 | Clapp et al. |
| 5,831,608 A | 11/1998 | Janay et al. |
| 5,841,977 A | 11/1998 | Ishizaki et al. |
| 5,867,821 A | 2/1999 | Ballantyne et al. |
| 5,878,271 A | 3/1999 | Crump et al. |
| 5,884,096 A | 3/1999 | Beasley et al. |
| 5,926,172 A | 7/1999 | Hanley |
| 5,926,509 A | 7/1999 | Stewart et al. |
| 5,948,092 A | 9/1999 | Crump et al. |
| 5,966,056 A | 10/1999 | Thornton |
| 6,006,256 A | 12/1999 | Zdepski et al. |
| 6,012,101 A | 1/2000 | Heller et al. |
| 6,038,616 A | 3/2000 | Thornton et al. |
| 6,047,054 A | 4/2000 | Bayless et al. |
| 6,073,188 A | 6/2000 | Fleming |
| 6,078,974 A | 6/2000 | Kirshtein |
| 6,119,146 A | 9/2000 | Heller et al. |
| 6,122,259 A | 9/2000 | Ishida |
| 6,150,997 A | 11/2000 | Asprey |
| 6,185,643 B1 | 2/2001 | Kirshtein et al. |
| 6,199,146 B1 | 3/2001 | Pence |
| 6,219,695 B1 | 4/2001 | Guttag et al. |
| 6,265,951 B1 | 7/2001 | Kirshtein |
| 6,333,750 B1 | 12/2001 | Odryna et al. |
| 6,363,452 B1 * | 3/2002 | Lach .................. 710/316 |
| 6,377,629 B1 | 4/2002 | Stewart et al. |
| 6,378,001 B1 | 4/2002 | Aditham et al. |
| 6,381,666 B1 | 4/2002 | Kejser et al. |
| 6,388,658 B1 | 5/2002 | Ahern et al. |
| 6,389,029 B1 | 5/2002 | McAlear |
| 6,412,031 B1 | 6/2002 | Grooters |
| 6,418,494 B1 | 7/2002 | Shatas et al. |
| 6,446,138 B1 | 9/2002 | Criscolo et al. |
| 6,505,245 B1 | 1/2003 | North et al. |
| 6,513,069 B1 | 1/2003 | Abato et al. |
| 6,539,438 B1 * | 3/2003 | Ledzius et al. .......... 710/8 |
| 6,544,174 B1 | 4/2003 | West et al. |
| 6,557,170 B1 | 4/2003 | Wilder et al. |
| 6,564,274 B1 * | 5/2003 | Heath et al. .......... 710/105 |
| 6,564,378 B1 | 5/2003 | Satterfield et al. |
| 6,654,825 B1 | 11/2003 | Clapp et al. |
| 2002/0056137 A1 | 5/2002 | Stewart et al. |
| 2002/0091850 A1 | 7/2002 | Perholtz et al. |
| 2002/0138682 A1 | 9/2002 | Shatas et al. |

FOREIGN PATENT DOCUMENTS

| | | |
|---|---|---|
| WO | WO 95/00917 | 1/1995 |
| WO | WO 99/18533 | 4/1999 |

OTHER PUBLICATIONS

Seok Soo Kim et al., "DooRae Distance Home Study System On DooRae Framework for Integrated Home Information Service" 1997, IEEE, pp. 75-78.

I Okoth et al, "DVB-CI: Gateway to Truly Interactive Multimedia Environment", 1997, IEEE, pp. 465 469.

A. Hastings et al, "ISDN Centrex Applications in a Large Multinational Company", 1992, IEEE, pp. 1737-1742.

Paul Cronin, "An Introduction of TSAPI and Network Telephony", 1996, IEEE, pp. 48-54.

Oliver Baltuch, "The Future Trends of PC Card Host Controllers", 1995, IEEE, pp. 148-152.

Meece, Mickey, "Plastic to Be Aboard When Gaming Takes Flight," American Banker, Jan. 7, 1994, vol. 159, No. 5, p. 14.

Hartley, Patrick H., "Cut Costs With Computing," School Planning and Management, May 2001, vol. 40, No. 5, p. 69 (five pages).

Microsoft Press Computer Dictionary, Microsoft, 1997, Third Edition, pp. 75-76.

Syromyatnikov, I. Y., et al., "Performance Analysis of Video Conferencing on Homogenous and Heterogenous Networks," 1996, IEEE, vol. 2, pp. 548-551.

Cox, John, "New breed of vendors embrace thin clients," Aug. 31, 1998, Network World, pp. 1-3.

* cited by examiner

SYSTEM OF CO-LOCATED COMPUTERS IN A FRAMEWORK INCLUDING REMOVABLE FUNCTION MODULES FOR ADDING MODULAR FUNCTIONALITY

BACKGROUND OF THE INVENTION

1. Field of the Invention

The present invention relates generally to computer systems and specifically to co-located computer systems in a framework including removable function modules which add modular functionality.

2. Description of the Related Art

Many commercial businesses and enterprises make extensive use of personal computers (PCs) in their daily operations. Typically, each user of a personal computer in the enterprise has a networked PC at their desk or work area. As the number of networked computer systems utilized in an enterprise increases, the management of such resources becomes increasingly complex and expensive. Some of the manageability issues involved in maintaining a large number of networked computer systems include ease of installation and deployment, the topology and physical logistics of the network, asset management, scalability (the cost and effort involved in increasing the number of units), troubleshooting network or unit problems, support costs, software tracking and management, as well as the simple issue of physical space, be it floor space or room on the desktop. In addition, there are security issues regarding physical assets, data protection, and software control. In many business establishments, such as call centers, there is no need for the user to install software on his/her unit, and in fact, management may specifically forbid employees from doing so. However, the standard personal computer configuration inherently provides the user this ability because the system is typically located with the user, and includes a floppy drive, CDROM, and one or more hard drives. Ensuring that unauthorized software is not installed on any of the machines in the network involves periodically personally auditing the software contents of each machine, at substantial cost in time and effort.

Many of these issues may be addressed by centralizing the locations of the personal computers, such as by installing multiple PCs into a central frame or cabinet. Prior art has generally been applied to servers and has focused on installing a standard PC into a sliding cabinet, where the term "standard PC" refers to a motherboard with extension slots, floppy disc and CD drives, and a general open architecture supporting almost any standard expansion card.

Two variations of this approach are typical. The first is to stand a standard PC motherboard on its edge to create a taller, thinner PC. All connections are on a rear panel and any ancillary boards plug in sideways to the motherboard. The second variation consists of plugging the PC motherboard into a back plane (either vertical or horizontal) which also receives any ancillary cards required. Both of these configurations lend themselves to a slide-drawer approach to packaging. However, there are numerous disadvantages with these approaches due to the fact that various compromises in size and feature set have been made to accommodate a wide assortment of feature addition cards. Such disadvantages include a higher product cost and a large physical size for each unit. In addition, the terminations and connections at the back of each unit are awkward to use—in the case of the first approach the terminations are on the motherboard, requiring the removal of all connectors before removing the board from its slide drawer case; in the case of the back plane based system the edge connections for each card have a high number of connections which creates a connection environment which is both fragile and difficult to administer.

One issue with clustered or co-located computers is adding functionality to each of the computers. In the present disclosure, the term "feature device" refers to a device that may be added to a computer which adds functionality to the computer. The prior art approach for adding operational features to clustered personal computers has typically been to install each feature device in a central location and run cables from each feature device to the appropriate I/O ports on each computer. This approach has numerous disadvantages, described below.

Using a variety of individual feature devices means the replication of items such as the feature device chassis and power supplies. These items are common to all the elements of the system but in a practical situation must reproduced individually in each feature device that provides a function or service. This replication substantially increases the cost of the system.

Typically additional feature devices in computers are designed and built by different manufactures, as each manufacturer tends to specialize in a given feature set. Connecting these divergent devices together requires both the fabrication and installation of many connecting cables, thereby greatly increasing the complexity and difficulty of system installation.

Additionally, scaling a particular feature upward, i.e., applying the new feature to added computer units compounds the issues of wiring and physical placement noted above. Such approaches resist expansion or extension of the system by creating a disproportionately heavy installation workload, and so decreases the scalability of the system.

Typically the multiple electronic packages used to add features to a system require additional space, cooling, and attention. The addition of the feature devices to a system may require redistribution of the original installed hardware, which may result in considerable planning effort and physical labor, as well as affecting the size of the system, which then may affect the space requirements and consequently, the location of the system.

Combining multiple feature sets in a system requires careful consideration of possible unintended and undesirable consequences caused by the relationships among processes and equipment. Considerable research and consideration should be given to the synergy of the feature elements in a system, which may be time consuming and expensive, and which may substantially increase the difficulty of designing the system. Once installed, tuning the actual performing relationships between the various hardware based feature sets requires substantial debugging time, cost, and special talent. The long term performance of the system is a function of interfacing as well as unique signaling conditions, and the increased cabling requirements may cause substantial performance limitations.

Finally, the use of multiple and varied feature devices from different vendors, which are typically connected in series, lowers the reliability of the system by compounding the devices' Mean Time Between Failures, thus decreasing the reliability of the system.

Therefore, improved systems and methods are desired for adding modular functionality to co-located computer systems.

SUMMARY OF THE INVENTION

The present invention comprises various embodiments of a system comprising one or more centrally located computers, wherein removable function modules may be used to provide additional functionality to the computers.

In one embodiment the system may include a cabinet or chassis, referred to as a cage, which has a plurality of slots. The computers may comprise computer cards which may be adapted to be inserted into respective slots of the cage. The cage may include a cage connector which is adapted to couple to an edge connector on each inserted computer card. Each computer card may be operable to slide into a slot the computer cage, thereby engaging the computer card edge connector with the cage connector. A removable function module may be operable to engage the cage connector, e.g., the removable function module may include a module connector that connects to the cage connector. The use of the cage connector as an intermediate connection between the computer cards and the function module allows the removal and/or exchange of computer cards without the need to disconnect the cables from the cage, as well as the removal and/or exchange of the function module without the need to disconnect the computer cards.

In one embodiment, the function module may include interfacing cable connectors corresponding to each computer card slot in the cage. The cable connectors may be operable to couple to one or more cables for communicating with external systems, such as networks and/or human interface devices. In one embodiment, the external connectors used for the cable connectors may be standard connectors, including one or more of RJ45, db9, db25, or dbhd15 connectors, or any other type of standard connector.

The function module may include one or more network cable ports for receiving one or more network cables to interface with one or more networks, as well as one or more human interface cable ports for receiving one or more human interface cables to interface with one or more human interfaces. In one embodiment, the cable ports may comprise RJ-45 connectors. In addition, the function module may also include a power supply which may be operable to supply power to the function module components.

In one embodiment, a function module may include circuitry which provides additional functionality to the computer cards. The function module may include multiple circuit boards to provide multiple additional functions to the computer system. In one embodiment, the function module may include a top cover and a bottom cover which may encapsulate multiple circuit boards, such as a network board and a layer 3 switch and router (SW3) board. In one embodiment, the network board may comprise an Ethernet board with active Ethernet Switch types 1 and 2. In one embodiment, the SW3 board may comprise an Ethernet Level 3 Switch and Router board. In one embodiment, the Ethernet board may connect to the cage connector, while the SW3 board is "piggybacked" on the Ethernet board. The Ethernet board may be operable to pass certain signals upward to the piggybacked SW3 board, thus permitting additional signal processing to occur.

In various embodiments, the function module may provide or include one or more of the following functions:

at least one cable connection module which is operable to provide cable connections to one or more cables for the plurality of computer cards;

at least one network card which is operable to provide a network interface to the plurality of computer cards;

at least one network switch which is operable to perform network switching functions for the plurality of computer cards;

at least one data switch which is operable to perform data switching functions for the plurality of computer cards; at least one router which is operable to perform network routing functions for the plurality of computer cards;

at least one network processing unit which is operable to perform network processing functions for the plurality of computer cards;

a Gigabit Ethernet network interface which includes a Gigabit Ethernet bus, wherein the Gigabit Ethernet network interface comprises a plurality of Gigabit Ethernet ports for each of at least a subset of the plurality of computer cards;

at least one gateway which is operable to perform gateway functions for the plurality of computer cards;

at least one firewall which is operable to restrict network access to the plurality of computer cards;

a human interface switching unit, wherein the human interface switching unit is configurable to route encoded human interface signals from one or more of the plurality of computer cards to one or more of a plurality of remote human interface devices coupled to the removable function module;

at least one analog POTS unit which is operable to provide standard analog telephony services to the plurality of computer cards;

at least one digital telephone which is operable to provide digital telephony services to the plurality of computer cards;

at least one PBX units which is operable to provide PBX services to the plurality of computer cards;

at least one Voice over Internet Protocol (VoIP) telecommunication device which is operable to provide VoIP services to the plurality of computer cards; and/or at least one MPEG video unit which is operable to provide MPEG video services to the plurality of computer cards.

In one embodiment, a plurality of computer cards may be inserted into the cage, each making electrical contact with the cage connector. A first removable function module may be attached to the cage, thereby coupling to at least a subset of the inserted computer cards via the module connector which connects to the cage connector. Attaching the first removable function module to the cage may include attaching one or more cables to the cable connectors to interface with external systems. For example, one or more network cables may be connected to network cable ports for interfacing to one or more networks, and/or one or more human interface cables may be connected to human interface ports for interfacing to one or more human interfaces. In one embodiment, one or more cables may be connected to the function module to couple the inserted computer cards to a telephone line. The first removable function module may be operable to provide a first functionality to the inserted computer cards, and may include any of the function modules described above. Then, the first removable function module may be removed from the cage assembly which may include removing some or all of the one or more attached cables. Finally, a second removable function module may be attached to the cage, in the manner described above. The second removable function module may be operable to provide a second functionality to the inserted computer cards, and may include any of the function modules described above.

The components of each human interface may include a keyboard, a pointing device such as a mouse, a display device such as a computer monitor, and/or any other human interface components. Each computer may communicate with the human interface by sending and receiving encoded human interface signals transmitted over one or more connecting cables. Each computer may include all the elements that make up a standard personal computer, such as a PC motherboard with a microprocessor CPU, memory, and network and interface logic, configured on a single card, and may be referred to as a computer card. In one embodiment, the network logic may include a LAN interface, Ethernet, or other network interface. In one embodiment, the interface logic may include keyboard, mouse, video, audio, USB, and/or any other interface circuitry associated with a PC motherboard, as well as human interface logic. The computer card may also include one or more hard disk drives or optical drives and a power supply which may be operable to convert the local main power to the appropriate voltages for the computer. The computer card may also include an interfacing edge connector, which may be operable to transmit video, mouse, keyboard, USB, and Ethernet signals, as well as any other peripheral or network signals to the user interface or a network, respectively.

Thus, in various embodiments, a variety of removable function cards may be added and/or removed from the cage assembly to provide various sets of functionality to the inserted computer cards as needed. The fact that both the computer cards and the function modules may be removed from the cage assembly without removing the other greatly simplifies the process of configuring and reconfiguring the system. The inclusion of removable function modules in the system provides a simple and affordable mechanism whereby additional feature sets may be provided for the plurality of computing systems as required. The use of function modules as described above enables an administrator to apply standard feature sets to multiple computing systems with ease and greatly decreases cabling requirements for the system.

BRIEF DESCRIPTION OF THE DRAWINGS

Other advantages and details of the invention will become apparent upon reading the following detailed description and upon reference to the accompanying drawings in which.

Figure 1:
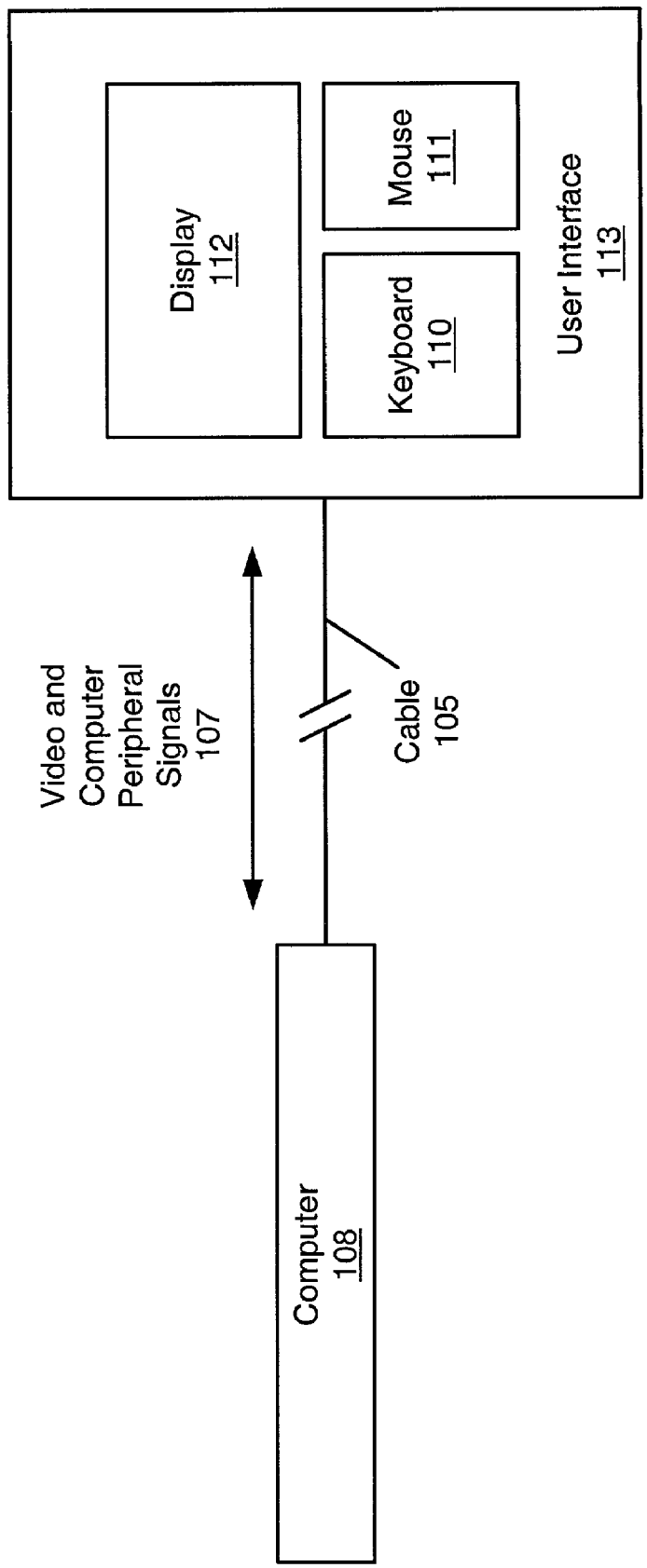
FIG. 1 is a block diagram of a computing system comprising a host computer coupled to a remote user interface, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

U.S. Provisional Patent No. 60/144,809 titled "A Technique To Extend The Operating Distance Of A Universal Serial Bus" is hereby incorporated by reference in its entirety as though fully and completely set forth herein.

U.S. Pat. No. 6,119,146 titled "Computer Network Having Multiple Remotely Located Human Interfaces Sharing A Common Computing System", which was filed May 4, 1998, whose inventors are Barry Thornton, Andrew Heller, Daniel Barrett, and Charles Ely, is hereby incorporated by reference in its entirety as though fully and completely set forth herein.

U.S. Pat. No. 6,038,616 titled "Computer System With Remotely Located Interface Where Signals Are Encoded At The Computer System, Transferred Through A 4-Wire Cable, And Decoded At The Interface", which was filed May 4, 1998, whose inventors are Barry Thornton, Andrew Heller, Daniel Barrett, and Charles Ely, is hereby incorporated by reference in its entirety as though fully and completely set forth herein.

U.S. Pat. No. 6,037,884 titled "Technique To Encode Multiple Digital Data Streams In Limited Bandwidth For Transmission In A Single Medium", which was filed Oct. 27, 1997, whose inventor is Barry Thornton, is hereby incorporated by reference in its entirety as though fully and completely set forth herein.

U.S. Pat. No. 6,020,839 titled "Analog Technique To Detect Asymmetric Radio Frequency Pulses", which was filed Oct. 27, 1997, whose inventor is Barry Thornton, is hereby incorporated by reference in its entirety as though fully and completely set forth herein.

U.S. Pat. No. 6,012,101 titled "Computer Network Having Commonly Located Computing Systems", which was filed May 4, 1998, whose inventors are Andrew Heller, Barry Thornton, Daniel Barrett, and Charles Ely, is hereby incorporated by reference in its entirety as though fully and completely set forth herein.

U.S. Pat. No. 5,994,952 titled "Narrow Band-Pass Interferometric Filter Having Enhanced Operational Characteristics", which was filed Oct. 22, 1997, whose inventor is Barry Thornton, is hereby incorporated by reference in its entirety as though fully and completely set forth herein.

U.S. Pat. No. 5,966,056 titled "Method And Apparatus For Enabling The Transmission Of Multiple Wide Bandwidth Electrical Signals", which was filed Jul. 3, 1996, whose inventor is Barry Thornton, is hereby incorporated by reference in its entirety as though fully and completely set forth herein.

U.S. Pat. No. 5,926,172, titled "Video Data Transmission And Display System And Associated Methods For Encoding/Decoding Synchronization Information And Video Data", which was filed Sep. 23, 1997, whose inventor is Williams Hanley, is hereby incorporated by reference in its entirety as though fully and completely set forth herein.

U.S. patent application Ser. No. 09/179,809 titled "A Technique To Transfer Multiple Data Streams Over A Wire Or Wireless Medium" is hereby incorporated by reference in its entirety as though fully and completely set forth herein.

U.S. patent application Ser. No. 09/619,989 titled "System And Method For Providing A Remote Universal Serial Bus", which was filed Jul. 20, 2000, whose inventors are Dan Barrett, Mike Barron, and Andrew Heller, is hereby incorporated by reference in its entirety as though fully and completely set forth herein.

U.S. patent application Ser. No. 09/680,760 titled "System And Method For Combining Computer Video And Remote Universal Serial Bus In An Extended Cable", which was filed Oct. 6, 2000, whose inventor is Barry Thornton, is hereby incorporated by reference in its entirety as though fully and completely set forth herein.

FIG. 1: A Computer System Coupled to a User Interface

FIG. 1 is a block diagram of a computing system comprising a computer 108 and a human interface (HI) 113. The HI may optionally be located remotely from the computer 108. Alternately, the HI 113 may instead be located closely to the computer system. The following describes one embodiment of the invention, where the HI 113 may be located remotely from the computer 108, however this is not intended to limit the invention. One or more connecting cables 105 may connect the computer 108 to the HI 113. As FIG. 1 shows, in one embodiment, the components of the HI may include a keyboard 110, a pointing device such as a mouse 111, a display device 112 such as a computer monitor, and/or any other human interface components. The computer 108 may communicate with the human interface 113 by sending and/or receiving encoded human interface signals 107 transmitted over the one or more connecting cables 105. The separation of the human interface 113 from the computer 108 may provide a number of benefits to a business or enterprise, including the isolation of means to install software, such as CDROMs, from the user, as well as the central location of multiple computers which may simplify both hardware and software maintenance. Additionally, the central location of multiple computers may accommodate the use of various feature devices or function modules, described below with reference to FIGS. 6–9. Further benefits of the system of FIG. 1 are described in U.S. Pat. No. 6,012,101. Further details of the system are provided below with respect to FIG. 2.

Figure 2:
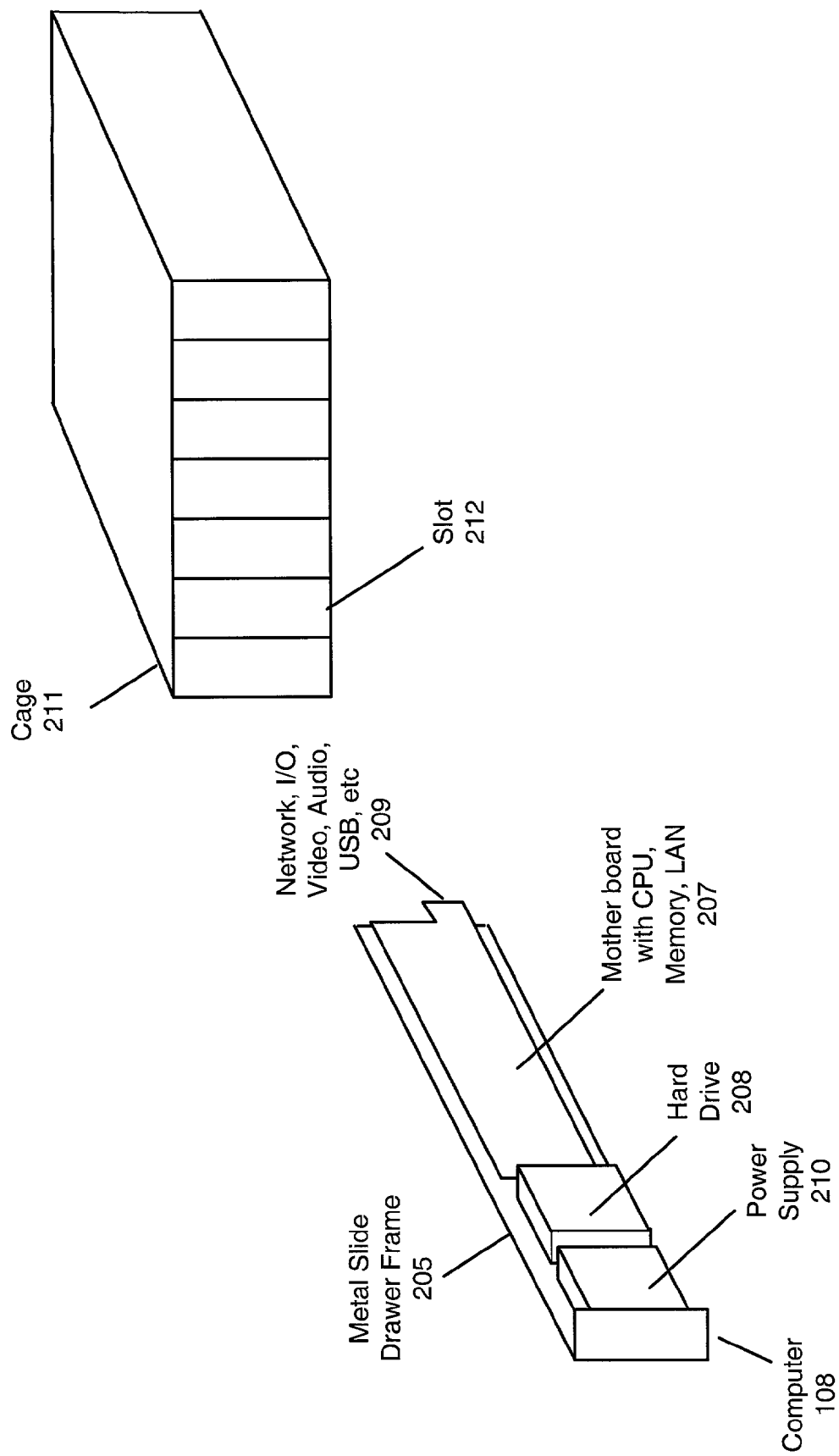
FIG. 2 illustrates a computer card mounted on a slide drawer, according to one embodiment.

FIG. 2: A Computer Card Including a Slide Drawer Frame

FIG. 2 illustrates one embodiment of computing system 108 in the form of a computer card. As FIG. 2 shows, in one embodiment the computing system may include slide drawer frame 205, printed circuit board 207 (or motherboard) mounted to the frame 205, and non-volatile memory 208 such as a hard drive or optical drive, also comprised on the frame 205. The computer card may communicate with external systems via edge connector 209. In one embodiment the edge connector 209 may be operable to communicate network signals with a network and an encoded set of human interface signals including video, keyboard, mouse, USB, and other human interface device signals with human interface 113. In one embodiment the computing system may further include power supply 210 mounted on the frame 205 and coupled to an external power source, which may be operable to provide power at the proper voltages to the computer 108.

As FIG. 2 also shows, in one embodiment the computer card 108 may be included in a system of co-located computers. The system may include a cabinet, referred to as a cage 211, having a plurality of slots 212. The computer card may be adapted to be inserted into one of the slots of the cage. The cage 211 may include a cage connector which is adapted to couple to the edge connector 209 on the computer card. The cage connector may also include an external second connector which is electrically coupled to the computer card 108 when the computer card 108 is inserted into the slot. The external second connector may be further adapted to couple to the one or more cables 105 for communication of the encoded one or more human interface signals with the remote location, i.e., the remote human interface 113. The use of the cage connector as an intermediate connection between computer cards 108 and the cables 105 allows the removal and/or exchange of computer cards 108 without the need to disconnect the cables 105 from the cage. If a particular computer card unit becomes non-functional, it may be removed and a new computer card inserted in its place very simply and quickly. In addition, the coupling of the computer cards 108 to the human interface through the cage connector may allow the easy insertion of removable function modules, described below with reference to FIGS. 6–9.

In the preferred embodiment of the invention, the computer card 108 is operable to slide into a slot of the cage 211, thereby making contact with the cage connector. The computer card may comprise a complete PC on a single slide drawer frame which may be only 3 rack units high (5.25 inches), and thus may occupy a much smaller space than standard PC units. Further details of the computer card 108 are presented below with reference to FIG. 3.

Figure 3:
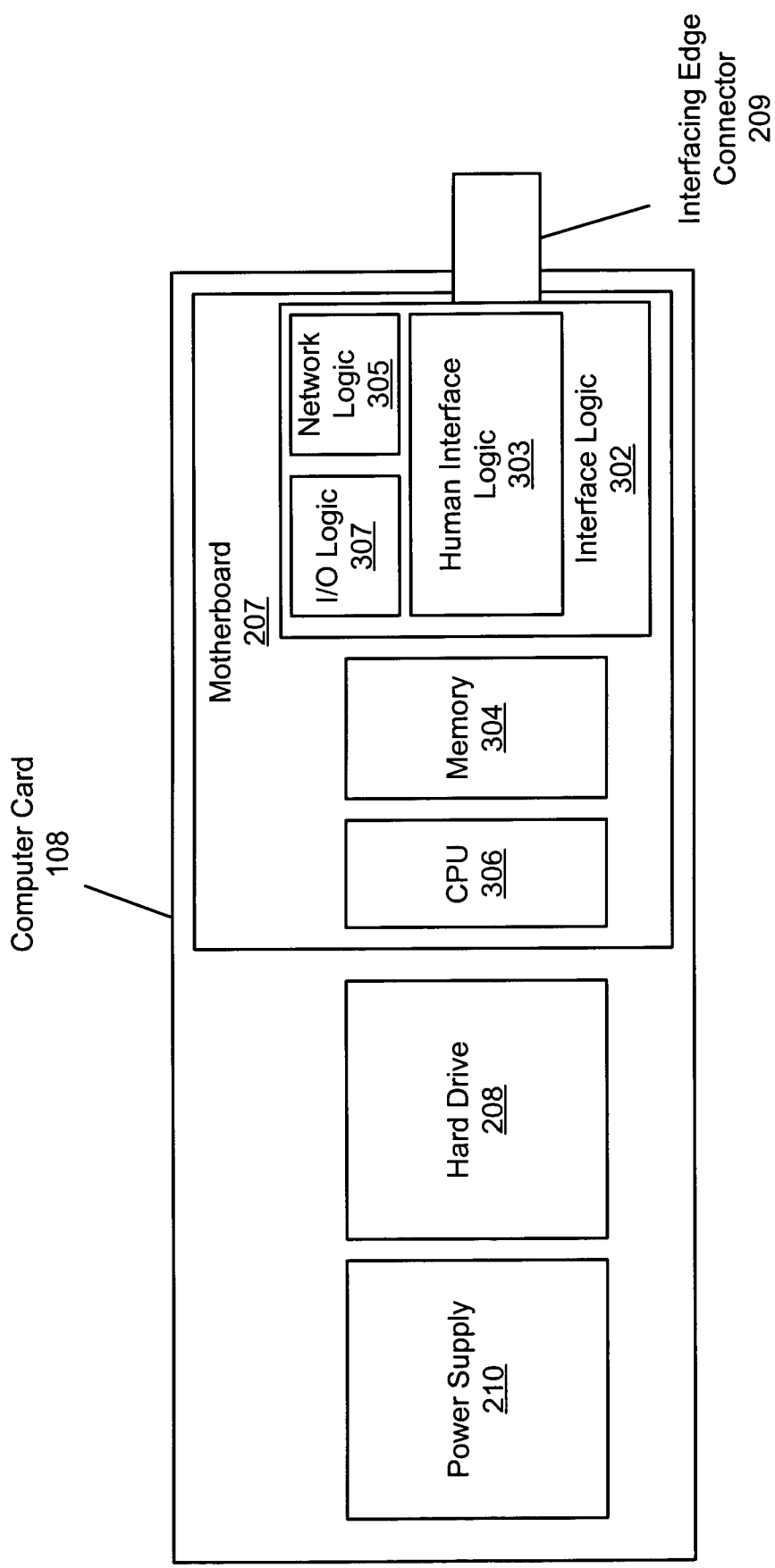
FIG. 3 is a detailed diagram of the computer card of FIG. 2.

FIG. 3: A Computer on a Card

FIG. 3 illustrates the computer card of FIG. 2, according to one embodiment. As FIG. 3 shows, the computer 108 may include a subset or all of the elements that make up a standard Personal Computer, such as PC motherboard 207 with various components such as a microprocessor CPU 306, memory 304, and interface logic 303 configured on a single card. In one embodiment, the interface logic 303 may include I/O logic 307, network logic 305, and human interface logic 303. In one embodiment, the network logic 305 may include a LAN interface, Ethernet, or any other network interface. In one embodiment, the I/O logic 307 may include video, audio, USB, and/or any other I/O interface circuitry associated with a PC motherboard. As shown, the computer card 108 may also include interfacing edge connector 209, which may be operable to transmit video, mouse, keyboard, USB, and Ethernet signals, as well as any other peripheral or network signals. In one embodiment, the edge connector 209 may include a human interface connector which may be operable to communicate human interface signals between the human interface logic 303 and human interface 113.

The human interface logic 303 comprised on the printed circuit board 207 may be operable to receive one or more human interface signals 107 from the I/O logic and encode the signals into a format suitable for transmission to a remote location, i.e., the remote human interface 113. In one embodiment the human interface logic 303 may be adapted to couple to the one or more cables 105 for transmission of the encoded human interface signals 107 to the remote location, such as through the human interface connector comprised on edge connector 209. In one embodiment, the human interface logic 303 may also be operable to receive one or more incoming encoded human interface signals 107 from the remote human interface 113 through the human interface connector, and to decode the incoming encoded human interface signals 107 to produce decoded human interface signals which may be transmitted to the I/O logic for use in the computing system. In one embodiment the human interface signals 107 sent and received by the human interface logic 303 may be encoded into a format for transmission over a distance exceeding 20 feet. In another embodiment, the human interface logic 303 may be operable to send and receive two or more encoded human interface signals 107 to and from the remote location. In yet another embodiment, the human interface logic 303 may be operable to send and receive three or more encoded human interface signals 107 to and from the remote location. For more information regarding the encoding and transmission of human interface signals over extended distances, please see U.S. Pat. No. 6,038,616 titled "Computer System With Remotely Located Interface Where Signals Are Encoded At The Computer System, Transferred Through A 4-Wire Cable, And Decoded At The Interface" by Thornton, et al., which is incorporated by reference above.

In one embodiment, the human interface signals 107 communicated between the computer 108 and the human interface 113 may include one or more of a video signal, keyboard signal, and pointing device signal, such as a mouse signal. In another embodiment, the communicated human interface signals 107 may include two or more of a video signal, keyboard signal, and pointing device signal. In a further embodiment, the communicated human interface signals 107 may include three or more of a video signal, keyboard signal, pointing device signal, and audio signal. In yet another embodiment, the human interface signals 107 may include USB signals for communication with one or more USB devices.

In one embodiment, interface logic of the computing system 108 may include keyboard logic comprised on the printed circuit board 207 for interfacing to keyboard 110. The keyboard logic may be coupled to the human interface logic and may be operable to generate keyboard signals that are provided to the human interface logic as part of the communicated human interface signals described above. The human interface logic 303 may also be operable to receive encoded keyboard signals as part of the encoded human interface signals described above, and to decode the encoded keyboard signals. The keyboard logic may be further operable to receive the decoded keyboard signals from the human interface logic 303.

In one embodiment, interface logic of the computing system 108 may include pointing device logic comprised on the printed circuit board 207 for interfacing to a pointing device 111. The pointing device logic may be coupled to the human interface logic 303 and may be operable to generate pointing device signals that are provided to the human interface logic 303 as part of the communicated human interface signals described above. The human interface logic 303 may also be operable to receive encoded pointing device signals as part of the encoded human interface signals 107 described above, and to decode the encoded pointing device signals. The pointing device logic may be further operable to receive the decoded pointing device signals from the human interface logic 303.

In one embodiment, interface logic of the computing system 108 may include USB logic comprised on the printed circuit board 207 for interfacing to a USB device. The USB logic may be coupled to the human interface logic 303 and may be operable to generate USB signals that are provided to the human interface logic 303 as part of the communicated human interface signals described above. The human interface logic 303 may also be operable to receive encoded USB signals as part of the encoded human interface signals described above, and to decode the encoded USB signals. The USB logic may be further operable to receive the decoded USB signals from the human interface logic 303.

In one embodiment, interface logic of the computing system 108 may include video logic comprised on the printed circuit board 207 for interfacing to a video device. The video logic may be coupled to the human interface logic 303 and may be operable to generate video signals that are provided to the human interface logic 303 as part of the communicated human interface signals described above. The human interface logic 303 may also be operable to receive encoded video signals as part of the encoded human interface signals 107 described above, and to decode the encoded video signals. The video logic may be further operable to receive the decoded video signals from the human interface logic 303.

In one embodiment, interface logic of the computing system 108 may include audio logic comprised on the printed circuit board 207 for interfacing to an audio device. The audio logic may be coupled to the human interface logic 303 and may be operable to generate audio signals that are provided to the human interface logic 303 as part of the communicated human interface signals described above. The human interface logic 303 may also be operable to receive encoded audio signals as part of the encoded human interface signals 107 described above, and to decode the encoded audio signals. The audio logic may be further operable to receive the decoded audio signals from the human interface logic 303.

In one embodiment, the computing system may further comprise network interface logic 305 comprised on the printed circuit board for interfacing to a network. The network logic 305 may be operable to encode network signals into a format suitable for transmission to the network. The network logic 305 may also be operable to receive encoded network signals from the network, and to decode the encoded network signals.

In one embodiment, the motherboard 207 may further include logic supporting PCI slot-based feature cards. The computer card 108 may also include one or more hard disk drives 208 or optical drives, and a power supply 210 which may be operable to convert the local main power to the appropriate voltages for the computer 108.

In a preferred embodiment, the computer card may have a long rectangular form factor, with the computer components mounted on one side. The computer card may be electrically coupled to the cage through edge connector 209 which faces to the rear of the computer card assembly. In the preferred embodiment the order of the elements from front to back are set to provide the greatest cooling for the hottest elements. The interface logic 302, which may comprise network logic 305, such as one or more LAN or WAN connections, typically IEEE803.2 (10/100 BaseT) Ethernet, as well as I/O logic 307 and human interface logic 303 for connecting to the human interface devices (HID), is located at the rear of the computer card frame, while the power supply and non-volatile memory (disk drive) are located at the front of the frame. The fact that each computer card has its own power supply on-board means that in the event of a power supply failure, only the affected computer card will fail. This feature is in contrast with prior art systems in which there is a single power supply located in the cabinet which supplies power to multiple computing units, thus presenting a single point of failure for the system.

In various other embodiments, the computer card may have various different form factors, including two dimensional forms, such as a square or rectangles of various proportions, as well as three-dimensional forms, such as a cubic form, or three dimensional rectangular forms of various proportions. In various embodiments, the computer card may be designed with components mounted on either or both sides of the card. In the various three dimensional embodiments, the components may be mounted on the inside surfaces of the form, the outside surfaces of the form, or both.

Figure 4:
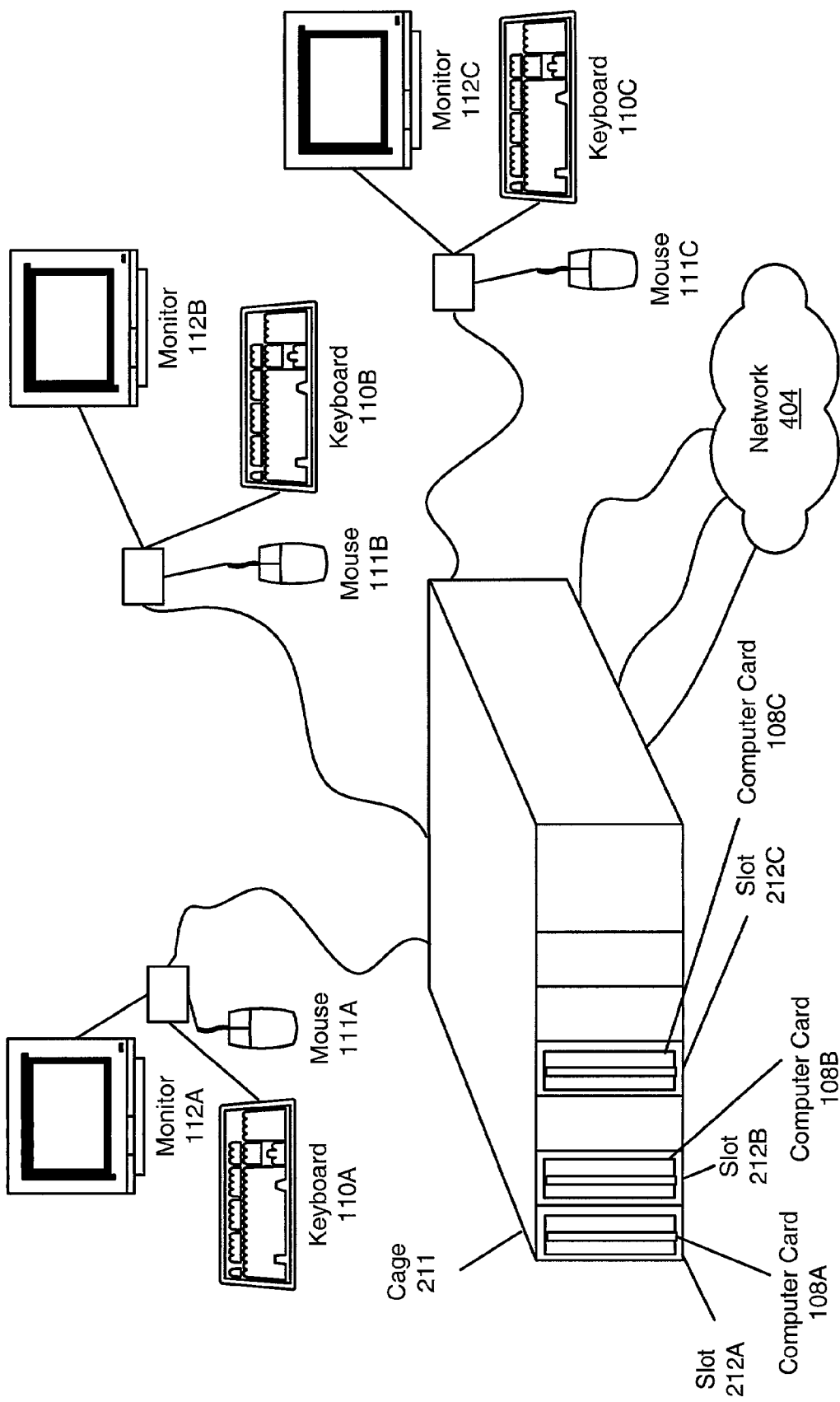
FIG. 4 illustrates a system comprising a plurality of computer cards coupled to a plurality of corresponding user interfaces.

FIG. 4: Multiple Computer Systems With Human Interfaces

FIG. 4 illustrates an embodiment of the system in which multiple computer cards 108 are inserted into the slots of the cage 211. As FIG. 4 shows, each computer card 108 may be coupled to a plurality of human interface devices through the cage connector and cables. As shown, computer card 108A may be inserted into cage slot 212A, and may thereby be coupled to keyboard 110A, mouse, 111A, and monitor 112A, which comprise the human interface 113A for that computer card. Computer cards 108B and 108C may be similarly inserted into respective slots 212B and 212C and coupled to respective human interface devices 113B and 113C as shown. Thus, the computer cards 108 may all be installed in the cage 211 at a central location, while the user interface 113 for each computer card 108 may be located remotely from the cage, such as at the respective work areas of the users of the computer cards. It should be noted that the human interface devices shown here are for illustration purposes only, and that the actual type and number of devices comprised in each human interface may vary.

FIG. 4 also shows that each computer card 108 may be coupled to a network 404. As described above with reference to FIG. 3, each computer card may include network logic for interfacing to the network 404. The network 404 may be one or more of a Local Area Network (LAN) or a Wide Area Network (WAN), such as the Internet.

The use of the cage assembly 211 to couple the computer cards 108 to their respective human interfaces 113 provides modularity to the system which may be used to deploy removable function modules, described below with reference to FIGS. 6–9.

Figure 5:
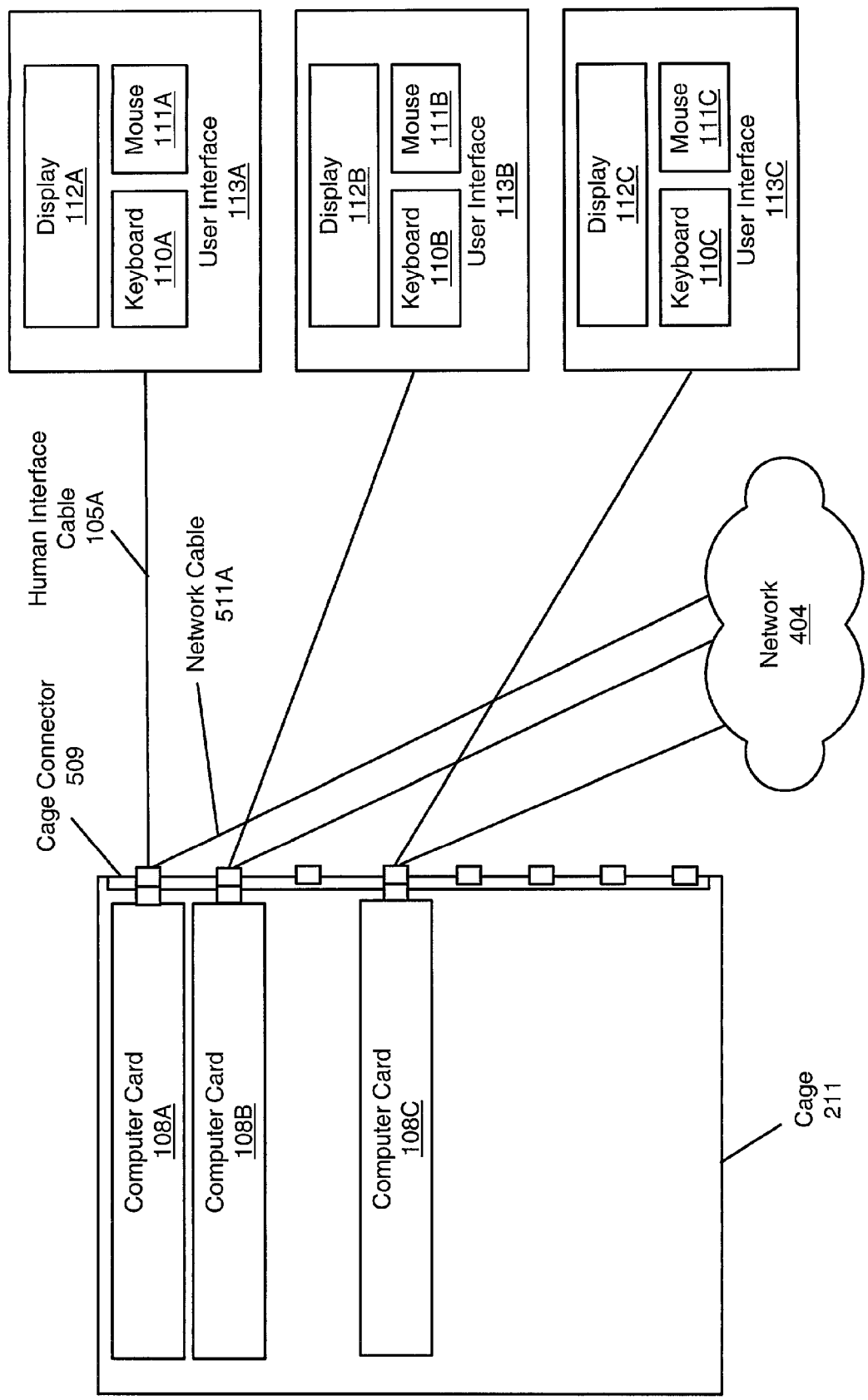
FIG. 5 is a block diagram of the system of FIG. 4.

FIG. 5: A Block Diagram of Multiple Computer Systems With Remote Human Interfaces FIG. 5 is a block diagram of the system described above with reference to FIG. 4. As FIG. 5 shows, the cage 211 may include cage connector 509 which is operable to couple to one or more human interface cables 105 for coupling to human interface devices and to one or more network cables 511 for coupling to one or more networks, respectively. In one embodiment, the computer cards 108 may be inserted into respective slots 212 of the cage 211, and coupled to respective user interfaces 113 through cage connector 509 and one or more human interface cables 105, such as cable 105A. Each user interface 113 may include one or more human interface devices, such as keyboard 110, mouse, 111, and monitor 112, or any other human interface device. As FIG. 5 also shows, each computer card 108 may also be coupled to network 404 through the cage connector 509 and the one or more network cables 511, such as 511A. In one embodiment, the network cable 511 may comprise an Ethernet cable. Thus, multiple computer cards 108 may be installed in a centrally located computer cage 211, and coupled to remote human interfaces 113 and network 404.

Figure 6:
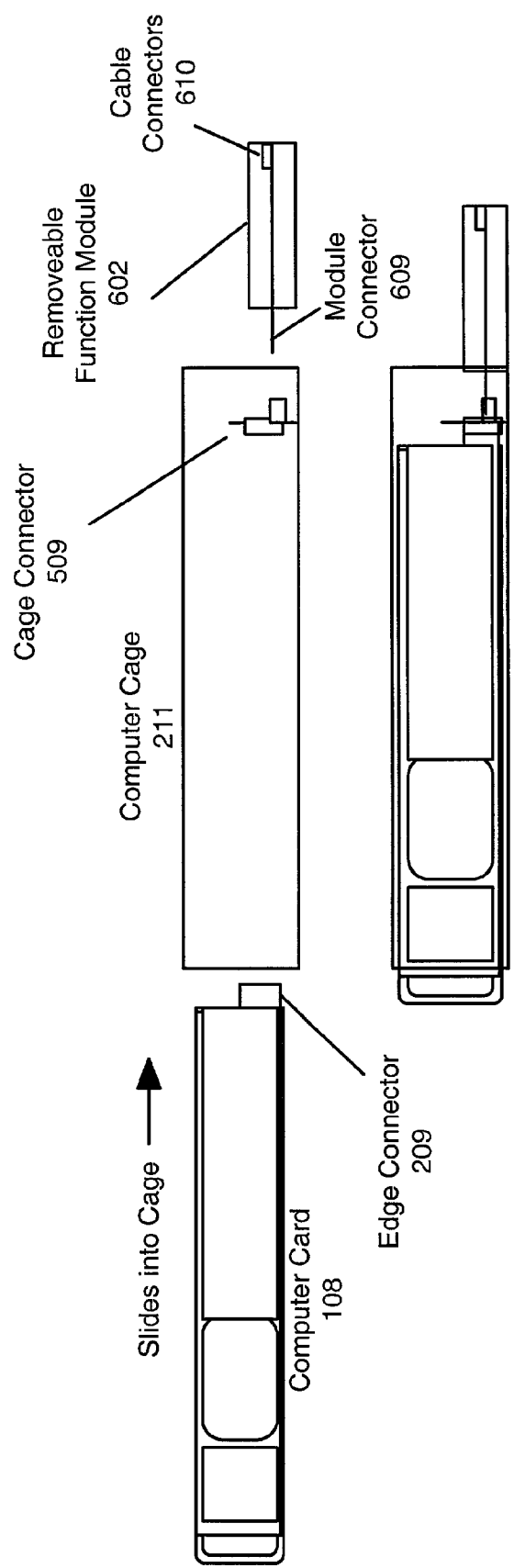
FIG. 6 illustrates the computer system of FIGS. 4 and 5, with a removable function module, according to one embodiment.

FIG. 6: Computer System With Removable Function Modules

FIG. 6 illustrates one embodiment of the computer system of FIGS. 4 and 5 with a removable function module. As FIG. 6 shows, the computer card 108 may be operable to slide into the computer cage 211, thereby engaging the computer card edge connector 209 with the cage connector 509. A removable function module 602 may be operable to engage the cage connector 509 via a module connector 609 which comprises a circuit board edge connector. As shown, the cage connector 509 may include a vertical connector which accepts the computer card edge connector 209, and a second, horizontal, connector which accepts the horizontal module connector 609. The cage connector 509 is therefore operable to turn the vertical signal path from the computer card 108 ninety degrees and connect to the horizontal module connector 609 of the function module 602. The use of the cage connector 509 as an intermediate connection between the computer cards 108 and the function module 602 allows the removal and/or exchange of computer cards 108 without the need to disconnect the cables from the cage, as well as the removal and/or exchange of the function module 602 without the need to disconnect the computer cards 108.

In one embodiment, the function module 602 may include interfacing cable connectors 610 corresponding to each computer card slot 212 in the cage 211. The cable connectors 610 may be operable to couple to one or more cables for communicating with external systems, such as networks and/or human interface devices. In one embodiment, the external connectors used for the cable connectors may be standard connectors, including one or more of RJ45, db9, db25, or dbhd15 connectors, or any other type of standard connector.

Figure 7:
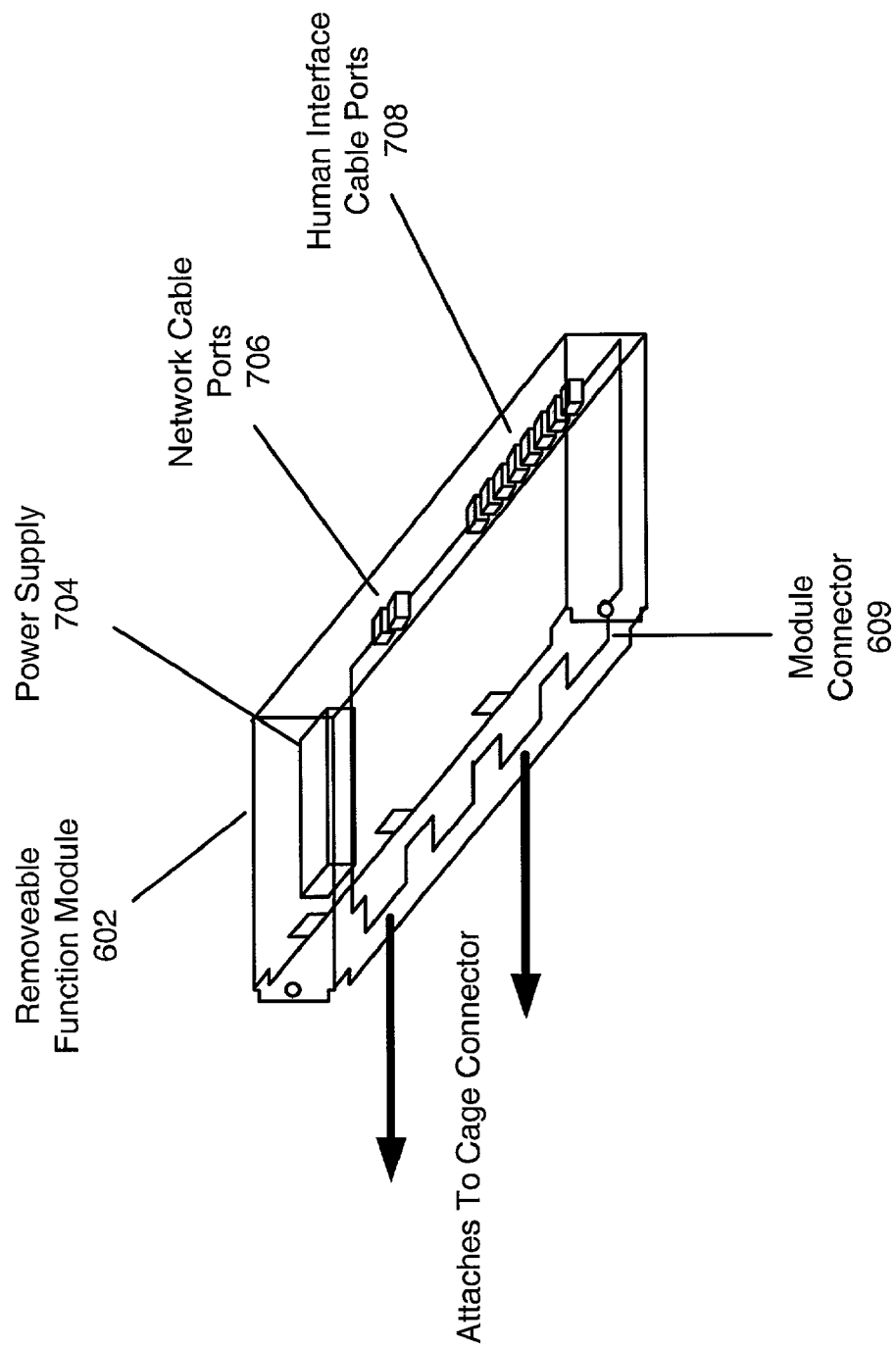
FIG. 7 illustrates one embodiment of a removable function module.

FIG. 7: Removable Function Module

FIG. 7 illustrates one embodiment of a removable function module in greater detail. As FIG. 7 shows, the function module 602 may include module connector 609 which is operable to connect to the cage 211 via cage connector 509, thereby coupling to the computer cards 108 which are inserted into respective slots 212 of the cage 211. The function module 602 may further include one or more network cable ports 706 for receiving one or more network cables 511 to interface with one or more networks 404, as well as one or more human interface cable ports 708 for receiving one or more human interface cables 510 to interface with one or more human interfaces 113. In one embodiment, the cable ports may comprise RJ-45 connectors. In addition, the function module 602 may also include a power supply 704 which may be operable to supply power to the function module components. Further embodiments of the function module 602 are described below with reference to FIG. 8.

Figure 8:
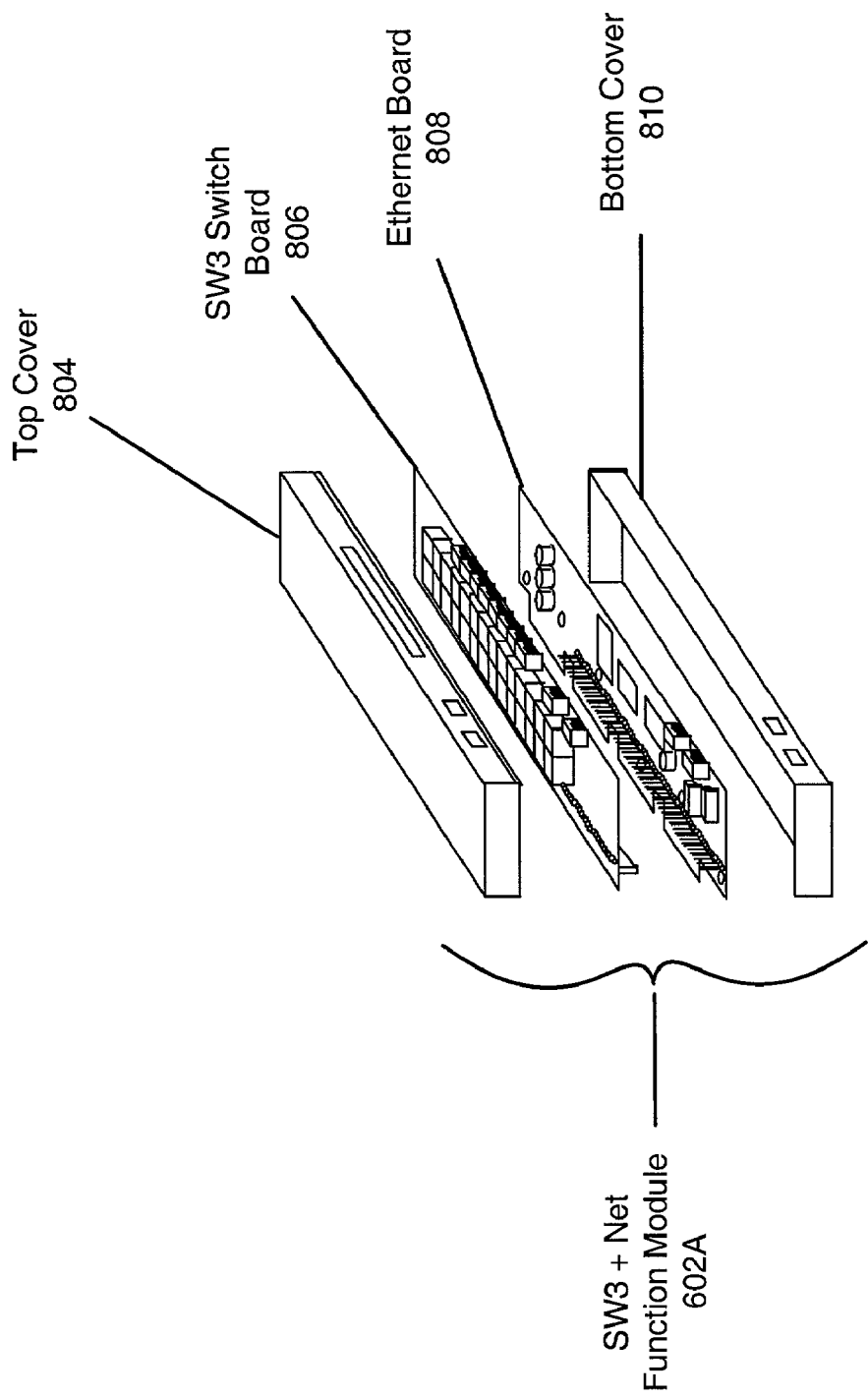
FIG. 8 illustrates one embodiment of a multi-board function module.

FIG. 8: A Multi-Board Function Module

FIG. 8 illustrates one embodiment of a multi-board removable function module. In one embodiment, a function module 602A may include circuitry which provides additional functionality to the computer cards 108. As FIG. 8 shows, the function module 602A may include multiple circuit boards to provide multiple additional functions to the computer system. In one embodiment, the function module 602A may include a top cover 804 and a bottom cover 810 which may encapsulate multiple circuit boards, such as a network board 808 and a layer 3 switch and router (SW3) board 806. In one embodiment, the network board 808 may comprise an Ethernet board with active Ethernet Switch types 1 and 2. In one embodiment, the SW3 board 806 may comprise an Ethernet Level 3 Switch and Router board. In one embodiment, the Ethernet board 808 may connect to the cage connector 509, while the SW3 board 806 is "piggybacked" on the Ethernet board 808. The Ethernet board 808 may be operable to pass certain signals upward to the piggybacked SW3 board 806, thus permitting additional signal processing to occur.

In one embodiment, a first removable function module 602, such as that described above with reference to FIG. 7, and which may be operable to provide a first functionality, such as interfacing the plurality of computer cards 108 with human interfaces 113 and a network 404, may be removed and replaced with a second removable function module 602A, such as the multi-board module described above, which may be operable to provide a second, additional, functionality. It should be noted that the function module exchange may be accomplished without the removal of the computer cards 108 from the cage 211. Thus, a variety of removable function modules 602 may be deployed to provide various additional functions to the plurality of computer cards 108 as desired.

In one embodiment, the function module 602 may include at least one cable connection module which is operable to provide cable connections to one or more cables for the plurality of computer cards 108.

In one embodiment, the function module 602 may include at least one network card, wherein the at least one network card is operable to provide a network interface to the plurality of computer cards 108.

In one embodiment, the function module 602 may include at least one network switch which is operable to perform network switching functions for the plurality of computer cards 108.

In one embodiment, the function module 602 may include at least one data switch which is operable to perform data switching functions for the plurality of computer cards 108.

In one embodiment, the function module 602 may include at least one router which is operable to perform network routing functions for the plurality of computer cards 108.

In one embodiment, the function module 602 may include at least one network processing unit which is operable to perform network processing functions for the plurality of computer cards 108.

In one embodiment, the function module 602 may include a Gigabit Ethernet network interface which includes a Gigabit Ethernet bus, wherein the Gigabit Ethernet network interface comprises a plurality of Gigabit Ethernet ports for each of at least a subset of the plurality of computer cards 108.

In one embodiment, the function module 602 may include at least one gateway which is operable to perform gateway functions for the plurality of computer cards 108.

In one embodiment, the function module 602 may include at least one firewall which is operable to restrict network access to the plurality of computer cards 108.

In one embodiment, the function module 602 may include a human interface switching unit, wherein the human interface switching unit is configurable to route encoded human interface signals from one or more of the plurality of computer cards to one or more of a plurality of remote human interface devices coupled to the removable function module 602.

In one embodiment, the function module 602 may include at least one analog POTS unit which is operable to provide standard analog telephony services to the plurality of computer cards 108.

In one embodiment, the function module 602 may include at least one digital telephone which is operable to provide digital telephony services to the plurality of computer cards 108.

In one embodiment, the function module 602 may include at least one PBX unit which is operable to provide PBX services to the plurality of computer cards 108.

In one embodiment, the function module 602 may include at least one Voice over Internet Protocol (VoIP) telecommunication device which is operable to provide VoIP services to the plurality of computer cards 108.

In one embodiment, the function module 602 may include at least one MPEG video unit which is operable to provide MPEG video services to the plurality of computer cards 108.

Figure 9:
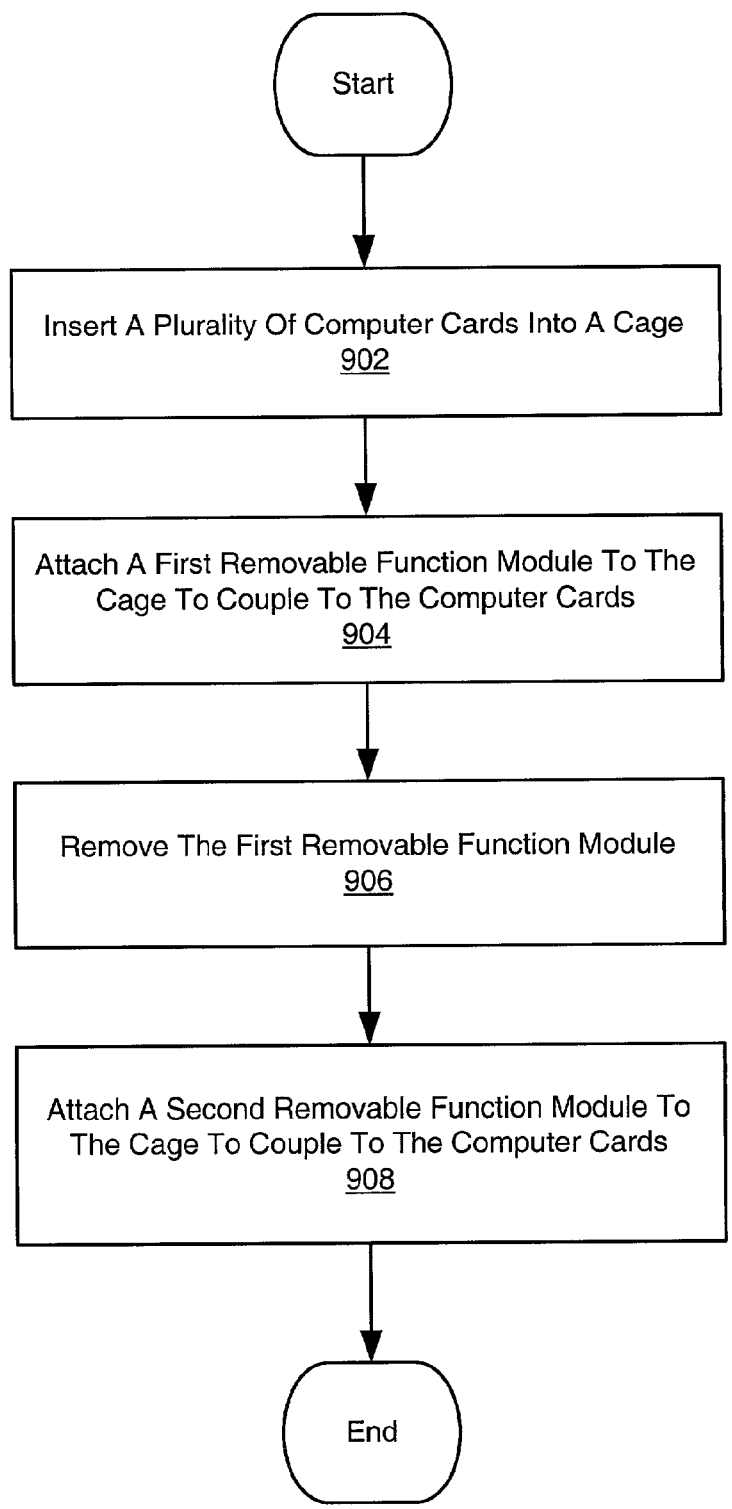
FIG. 9 is a flowchart of a method for configuring a plurality of computing systems.

FIG. 9: A Method for Configuring a Plurality of Computing Systems

FIG. 9 is a flowchart of a method for configuring a plurality of computing systems, according to one embodiment. As shown in FIG. 9, a plurality of computer cards 108 may be inserted into a cage 211, as indicated in 902. In one embodiment, the inserted computer cards 108 may each make electrical contact with cage connector 509, as described above with reference to FIGS. 5 and 6.

In 904, a first removable function module 602 may be attached to the cage 211, thereby coupling to at least a subset of the inserted computer cards 108. As described above with reference to FIGS. 6 and 7, the function module 602 may electrically couple to the inserted computer cards via module connector 609 which connects to the cage connector 509. In one embodiment, attaching the first removable function module 602 to the cage 211 may include attaching one or more cables to the cable connectors 610 to interface with external systems. For example, one or more network cables 511 may be connected to network cable ports 706 for interfacing to one or more networks 404, and one or more human interface cables 510 may be connected to human interface ports 708 for interfacing to one or more human interfaces 113. In one embodiment, one or more cables may be connected to the function module 602 to couple the inserted computer cards to a telephone line. The first removable function module 602 may be operable to provide a first functionality to the inserted computer cards 108, and may include any of the function modules described above with respect to FIG. 7.

In 906, the first removable function module 602 may be removed from the cage assembly 211. In one embodiment, removing the first removable function module 602 from the cage 211 may include removing some or all of the one or more attached cables 511 and 510.

Finally, in 908, a second removable function module 602 may be attached to the cage 211, thereby coupling to at least a subset of the inserted computer cards 108. As described above with reference to FIGS. 6 and 7, the function module 602A may electrically couple to the inserted computer cards via module connector 609 which connects to the cage connector 509. In one embodiment, attaching the second removable function module 602 to the cage 211 may include attaching one or more cables to the cable connectors 610 to interface with external systems. For example, one or more network cables 511 may be connected to network cable ports 706 for interfacing to one or more networks 404, and one or more human interface cables 510 may be connected to human interface ports 708 for interfacing to one or more human interfaces 113. In one embodiment, one or more cables may be connected to the function module 602 to couple the inserted computer cards to a telephone line. The second removable function module 602 may be operable to provide a second functionality to the inserted computer cards 108, and may include any of the function modules described above with respect to FIG. 8.

Thus, in various embodiments, a variety of removable function cards 602 may be added and/or removed from the cage assembly to provide various sets of functionality to the inserted computer cards 108 as needed. The fact that both the computer cards 108 and the function modules 602 may be removed from the cage assembly 211 without removing the other greatly simplifies the process of configuring and reconfiguring the system.

The system and method described above solve many of the problems of the prior art. By centralizing the location of the computing elements while permitting the remote location of the human interfaces to the computers, the management of both the hardware and software may be greatly simplified. The inclusion of removable function modules in the system provides a simple and affordable mechanism whereby additional feature sets may be provided for the plurality of computing systems as required. The use of function modules as described above enables an administrator to apply standard feature sets to multiple computing systems with ease and greatly decreases cabling requirements for the system by eliminating installation wiring between the computers and the additional feature set devices (function modules). Additionally, the feature set hardware may be added without requiring any additional vertical installation space. Finally, the various feature set devices may be added to and removed from the system without requiring any other equipment to be moved.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system comprising a plurality of computing systems, the system comprising:
    a cage having a plurality of slots, wherein each of the slots is configured to receive a computer card;
    a plurality of computer cards, wherein each computer card comprises a respective computing system of the plurality of computing systems, wherein each computer card includes a processor and a memory for executing at least one application program, and logic operable to encode signals for transmission to a respective remote location to communicate with a respective at least one human interface device at the remote location, wherein the remote location is more than 20 feet from the cage;
    a removable function module, wherein the removable function module is operable to electrically couple to the plurality of computer cards, wherein the removable function module is operable to provide additional functionality to each of the computer cards comprised in the slots of the cage.

2. The system of claim 1, wherein each of the plurality of computer cards is configured for coupling to one or more cables for communication of encoded human interface signals with a remote location.

3. The system of claim 2, wherein each of the plurality of computer cards is further configured for communication of network signals with a network.

4. The system of claim 1, wherein the cage further includes a cage connector positioned proximate to each of the slots of the cage, wherein the cage connector includes a plurality of computer card connectors which are each configured to couple to one of the computer cards when the computer cards are inserted into slots of the cage, wherein the cage connector further includes a plurality of second connectors electrically coupled to the plurality of computer card connectors;
    wherein the removable function module is operable to be coupled to the plurality of second connectors.

5. The system of claim 4, wherein the plurality of second connectors are each configured for coupling to one or more cables for communication of encoded human interface signals with a remote location, and for communication of network signals with a network.

6. The system of claim 1, wherein the removable function module is a first removable function module that provides first functionality;
    wherein the first removable function module is operable to be removed and replaced with a second different removable function module, wherein the second removable function module provides second different functionality to each of the computer cards comprised in the slots of the cage.

7. The system of claim 1,
    wherein the removable function module comprises one or more of:
        at least one cable connection module, wherein the at least one cable connection module is operable to provide cable connections to one or more cables for the plurality of computer cards;
        at least one network card, wherein the at least one network card is operable to provide a network interface to the plurality of computer cards; and
        at least one network switch, wherein the at least one network switch is operable to perform network switching functions for the plurality of computer cards;
        at least one data switch, wherein the at least one data switch is operable to perform data switching functions for the plurality of computer cards;
        at least one network router, wherein the at least one network router is operable to perform network routing functions for the plurality of computer cards;
        at least one network processing unit, wherein the at least one network processing unit is operable to perform network processing functions for the plurality of computer cards;
        a Gigabit Ethernet network interface, wherein the Gigabit Ethernet network interface includes a Gigabit Ethernet bus, wherein the Gigabit Ethernet network interface comprises a plurality of Gigabit Ethernet ports for each of at least a subset of the plurality of computer cards;
        at least one gateway, wherein the at least one gateway is operable to perform gateway functions for the plurality of computer cards;
        at least one firewall, wherein the at least one firewall is operable to restrict network access to the plurality of computer cards;
        a human interface switching unit, wherein the human interface switching unit is configurable to route encoded human interface signals from one or more of the plurality of computer cards to one or more of a plurality of remote human interface devices coupled to the removable function module;

at least one analog POTS unit, wherein the at least one analog POTS unit is operable to provide standard analog telephony services to the plurality of computer cards;

at least one digital telephone, wherein the at least one digital telephone is operable to provide digital telephony services to the plurality of computer cards;

at least one PBX unit, wherein the at least one PBX unit is operable to provide PBX services to the plurality of computer cards;

at least one Voice over Internet Protocol (VoIP) telecommunication device, wherein the at least one VoIP telecommunication device is operable to provide VoIP services to the plurality of computer cards;

at least one MPEG video unit, wherein the at least one MPEG video unit is operable to provide MPEG video services to the plurality of computer cards.

8. The system of claim 1, wherein the external connectors are standard connectors, and wherein the standard connectors comprise one or more of RJ45, db9, db25, or dbhd15 connectors.

9. The system of claim 1, wherein the plurality of computing systems comprises a plurality of independent computing systems.

10. The system of claim 1, wherein each computer card comprises:
a frame;
a printed circuit board mounted to the frame;
a CPU comprised on the printed circuit board;
a memory comprised on the printed circuit board;
a non-volatile memory comprised on the frame;
network interface logic comprised on the printed circuit board for interfacing to a network;
human interface logic comprised on the printed circuit board which is operable to receive two or more human interface signals and encode the two or more human interface signals into a format suitable for transmission to a remote location;
wherein the human interface logic is further operable to receive two or more encoded human interface signals from the remote location and decode the two or more encoded human interface signals from a format suitable for transmission from the remote location;
a human interface connector coupled to the human interface logic, wherein the human interface connector is configured to couple to the one or more cables for communication of the encoded human interface signals with a remote location; and
a power supply comprised on the frame, wherein the power supply is operable to couple to an external power source and supply power to the plurality of computing systems.

11. A system comprising a plurality of computing systems, the system comprising:
a cage having a plurality of slots, wherein each of the slots is configured to receive a computer card;
a plurality of computer cards, wherein each computer card comprises a respective computing system of the plurality of computing systems, wherein each computer card includes a processor and a memory for executing at least one application program, and logic operable to encode signals for transmission to a respective remote location to communicate with a respective at least one human interface device at the remote location, wherein the remote location is more than 20 feet from the cage;
wherein the cage further includes a cage connector positioned proximate to each of the slots of the cage, wherein the cage connector includes a plurality of computer card connectors which are each configured to couple to one of the computer cards when the computer cards are inserted into slots of the cage, wherein the cage connector further includes a plurality of second connectors electrically coupled to the plurality of computer card connectors; and a removable function module, wherein the removable function module is operable to couple to the plurality of second connectors, wherein the removable function module is operable to provide additional functionality to each of the computer cards comprised in the slots of the cage.

12. The system of claim 11, wherein each of the plurality of computer cards is configured for coupling to one or more cables for communication of encoded human interface signals with a remote location, and for communication of network signals with a network.

13. The system of claim 12, wherein each of the plurality of computer cards is configured for coupling to the one or more cables through the plurality of second connectors.

14. The system of claim 12, wherein each of the plurality of computer cards is configured for coupling to the one or more cables through the plurality of second connectors and through the removable function module.

15. The system of claim 11, wherein the removable function module is a first removable function module that provides first functionality;
wherein the first removable function module is operable to be removed and replaced with a second different removable function module, wherein the second removable function module provides second different functionality to each of the computer cards comprised in the slots of the cage.

16. The system of claim 11,
wherein the removable function module comprises one or more of:
at least one cable connection module, wherein the at least one cable connection module is operable to provide cable connections to one or more cables for the plurality of computer cards;
at least one network card, wherein the at least one network card is operable to provide a network interface to the plurality of computer cards; and
at least one network switch, wherein the at least one network switch is operable to perform network switching functions for the plurality of computer cards;
at least one data switch, wherein the at least one data switch is operable to perform data switching functions for the plurality of computer cards;
at least one network router, wherein the at least one network router is operable to perform network routing functions for the plurality of computer cards;
at least one network processing unit, wherein the at least one network processing unit is operable to perform network processing functions for the plurality of computer cards;
a Gigabit Ethernet network interface, wherein the Gigabit Ethernet network interface includes a Gigabit Ethernet bus, wherein the Gigabit Ethernet network interface comprises a plurality of Gigabit Ethernet ports for each of at least a subset of the plurality of computer cards;
at least one gateway, wherein the at least one gateway is operable to perform gateway functions for the plurality of computer cards;

at least one firewall, wherein the at least one firewall is operable to restrict network access to the plurality of computer cards;

a human interface switching unit, wherein the human interface switching unit is configurable to route encoded human interface signals from one or more of the plurality of computer cards to one or more of a plurality of remote human interface devices coupled to the removable function module;

at least one analog POTS unit, wherein the at least one analog POTS unit is operable to provide standard analog telephony services to the plurality of computer cards;

at least one digital telephone, wherein the at least one digital telephone is operable to provide digital telephony services to the plurality of computer cards;

at least one PBX units, wherein the at least one PBX unit is operable to provide PBX services to the plurality of computer cards;

at least one Voice over Internet Protocol (VoIP) telecommunication device, wherein the at least one VoIP telecommunication device is operable to provide VoIP services to the plurality of computer cards;

at least one MPEG video unit, wherein the at least one MPEG video unit is operable to provide MPEG video services to the plurality of computer cards.

17. The system of claim 11, wherein the external connectors are standard connectors, wherein the standard connectors comprise one or more of RJ45, db9, db25, or dbhd15 connectors.

18. The system of claim 11, wherein the plurality of computing systems comprises a plurality of independent computing systems.

19. The system of claim 11, wherein each computer card comprises: a frame; a printed circuit board mounted to the frame; a CPU comprised on the printed circuit board; a memory comprised on the printed circuit board; a non-volatile memory comprised on the frame;

network interface logic comprised on the printed circuit board for interfacing to a network;

human interface logic comprised on the printed circuit board which is operable to receive two or more human interface signals and encode the two or more human interface signals into a format suitable for transmission to a remote location; and a human interface connector coupled to the human interface logic, wherein the human interface connector is configured to couple to the one or more cables for transmission of the encoded human interface signals to a remote location; and a power supply comprised on the frame, wherein the power supply is operable to couple to an external power source and supply power to the plurality of computing systems.

20. The system of claim 11, further comprising a cable connection module, wherein the cable connection module comprises a plurality of third connections which are operable to electrically connect to the plurality of second connectors, and wherein the cable connection module is further operable to couple to one or more cables for one or more of communications between each computer card and respective remote locations, and communications between each computer card and a network.

21. A method for configuring a plurality of computing systems, the method comprising:

inserting a plurality of computer cards into a cage, wherein each computer card comprises a respective computing system of the plurality of computing systems, wherein each computer card includes a processor and a memory for executing at least one application program, and logic operable to encode signals for transmission to a respective remote location to communicate with a respective at least one human interface device at the remote location, wherein the remote location is more than 20 feet from the cage, wherein the cage comprises a plurality of slots, wherein each of the slots is configured to receive one of the computer cards; and attaching a first removable function module to electrically connect with the plurality of computer cards, wherein the first removable function module provides a first additional functionality to each of the at least a subset of the plurality of computer cards comprised in the slots of the cage.

22. The method of claim 21, further comprising: removing the first removable function module; and attaching a second removable function module to electrically connect with at least a subset of the plurality of computer cards, wherein the second removable function module provides a second additional functionality to each of the at least a subset of the plurality of computer cards comprised in the slots of the cage.

23. The method of claim 21, further comprising:

electrically coupling each of the computer cards to one or more cables, wherein the one or more cables are configured to couple each of the computer cards to respective one or more human interface devices located remotely from the cage.

24. The method of claim 23, wherein said electrically coupling comprises attaching the one or more cables to the first removable function module, wherein the one or more cables couple the first removable function module to the one or more human interface devices.

25. The method of claim 23, wherein the one or more human interface devices are located more than 20 feet from the cage.

26. The method of claim 21, further comprising:

electrically coupling each of the computer cards to one or more cables, wherein the one or more cables are configured to couple each of the computer cards to a network.

27. The method of claim 26, wherein said electrically coupling comprises attaching the one or more cables to the first removable function module, wherein the one or more cables couple the first removable function module to the network.

28. The method of claim 21, further comprising:

electrically coupling each of the computer cards to one or more cables, wherein the one or more cables are configured to couple the plurality of computer cards to one or more telephone lines.

29. The method of claim 28, wherein said electrically coupling comprises attaching the one or more cables to the first removable function module, wherein the one or more cables couple the first removable function module to the one or more telephone lines.

30. The method of claim 21, wherein each computer card comprises: a frame; a printed circuit board mounted to the frame; a CPU comprised on the printed circuit board; a memory comprised on the printed circuit board; a non-volatile memory comprised on the frame;

network interface logic comprised on the printed circuit board for interfacing to a network;

human interface logic comprised on the printed circuit board which is operable to receive two or more human interface signals and encode the two or more human interface signals into a format suitable for transmission to a remote location; and a human interface connector coupled to the human interface logic, wherein the human interface connector is configured to couple to one or more cables for transmission of the encoded human interface signals to the remote location;

wherein the human interface logic is further operable to receive two or more encoded human interface signals from the remote location and decode the two or more encoded human interface signals from a format suitable for transmission from the remote location; and wherein the human interface connector is further configured to couple to the one or more cables for reception of the encoded human interface signals from the remote location.

31. A method for configuring a plurality of computing systems, the method comprising:

inserting a plurality of computer cards into a cage, wherein each computer card comprises a respective computing system of the plurality of computing systems, wherein each computer card includes a processor and a memory for executing at least one application program, and logic operable to encode signals for transmission to a respective remote location to communicate with a respective at least one human interface device at the remote location, wherein the remote location is more than 20 feet from the cage, wherein the cage comprises a plurality of slots, wherein each of the slots is configured to receive one of the computer cards, wherein the cage further includes a cage connector positioned proximate to each of the slots of the cage, wherein the cage connector includes a plurality of computer card connectors which are each coupled to one of the computer cards when the computer cards are inserted into the slots of the cage, wherein the cage connector further includes a plurality of second connectors electrically coupled to the plurality of computer card connectors;

attaching a first removable function module to the plurality of second connectors, wherein the first removable function module provides a first additional functionality to each of the computer cards comprised in the slots of the cage; and attaching one or more cables to the first removable function module, wherein the one or more cables couple the first removable function module to one or more of a plurality of human interface devices located remotely from the cage.

32. The method of claim 31, further comprising: detaching the one or more cables from the first removable function module;

detaching the first removable function module from the plurality of second connectors;

attaching a second removable function module to the plurality of second connectors, wherein the second removable function module provides a second additional functionality to each of the computer cards comprised in the slots of the cage; and attaching the one or more cables to the second removable function module, wherein the one or more cables couple the second removable function module to the one or more of the plurality of human interface devices located remotely from the cage.

33. The method of claim 31, wherein the one or more cables also couple the first removable function module to one or more networks for communication between the plurality of computer cards and the one or more networks.

34. The method of claim 31, wherein the one or more cables also couple the first removable function module to one or more telephone lines for communication of telephony signals between the plurality of computer cards and the one or more telephone lines.

35. The method of claim 31, wherein the plurality of computing systems comprises a plurality of independent computing systems.

36. The method of claim 31, wherein each computer card comprises: a frame; a printed circuit board mounted to the frame; a CPU comprised on the printed circuit board; a memory comprised on the printed circuit board; a non-volatile memory comprised on the frame;

network interface logic comprised on the printed circuit board for interfacing to a network;

human interface logic comprised on the printed circuit board which is operable to receive two or more human interface signals and encode the two or more human interface signals into a format suitable for transmission to at least one of the plurality of human interface devices; and a human interface connector coupled to the human interface logic, wherein the human interface connector is configured to couple to the one or more cables for transmission of the encoded human interface signals to the at least one of the plurality of human interface devices;

wherein the human interface logic is further operable to receive two or more encoded human interface signals from the at least one of the plurality of human interface devices and decode the two or more encoded human interface signals from a format suitable for transmission from the at least one of the plurality of human interface devices; and wherein the human interface connector is further configured to couple to the one or more cables for reception of the encoded human interface signals from the at least one of the plurality of human interface devices.

37. A system, comprising:

a cage comprising slots for at least two computer cards, wherein each slot allows a computer card to be inserted and removed;

at least two computer cards in at least two slots of the cage, wherein each computer card comprises a computing system, wherein each computer card comprises a processor and a memory for executing at least one application program and logic operable to encode signals for transmission to a respective remote location to communicate with a respective at least one human interface device at the remote location, wherein the remote location is more than 20 feet from the cage;

a cage connector with multiple edge connector receiving slots, wherein each of the at least two computer cards has an edge connector that is received into a respective edge connector receiving slot of the cage connector when the computer card is inserted into the cage;

a removeable function module coupled to at least two computer cards through the cage connector, wherein the removeable function module is capable of interacting with each of the at least two computer cards to add functionality to each of the at least two computer cards.

38. The system of claim 37, wherein the removable function module comprises one or more of:
    at least one cable connection module, wherein the at least one cable connection module is operable to provide cable connections to one or more cables for the plurality of computer cards;
    at least one network card, wherein the at least one network card is operable to provide a network interface to the plurality of computer cards; and
    at least one network switch, wherein the at least one network switch is operable to perform network switching functions for the plurality of computer cards;
    at least one data switch, wherein the at least one data switch is operable to perform data switching functions for the plurality of computer cards;
    at least one network router, wherein the at least one network router is operable to perform network routing functions for the plurality of computer cards;
    at least one network processing unit, wherein the at least one network processing unit is operable to perform network processing functions for the plurality of computer cards;
    a Gigabit Ethernet network interface, wherein the Gigabit Ethernet network interface includes a Gigabit Ethernet bus, wherein the Gigabit Ethernet network interface comprises a plurality of Gigabit Ethernet ports for each of at least a subset of the plurality of computer cards;
    at least one gateway, wherein the at least one gateway is operable to perform gateway functions for the plurality of computer cards;
    at least one firewall, wherein the at least one firewall is operable to restrict network access to the plurality of computer cards;
    a human interface switching unit, wherein the human interface switching unit is configurable to route encoded human interface signals from one or more of the plurality of computer cards to one or more of a plurality of remote human interface devices coupled to the removable function module;
    at least one analog POTS unit, wherein the at least one analog POTS unit is operable to provide standard analog telephony services to the plurality of computer cards;
    at least one digital telephone, wherein the at least one digital telephone is operable to provide digital telephony services to the plurality of computer cards;
    at least one PBX unit, wherein the at least one PBX unit is operable to provide PBX services to the plurality of computer cards;
    at least one Voice over Internet Protocol (VoIP) telecommunication device, wherein the at least one VoIP telecommunication device is operable to provide VoIP services to the plurality of computer cards;
    at least one MPEG video unit, wherein the at least one MPEG video unit is operable to provide MPEG video services to the plurality of computer cards.

39. The system of claim 37, wherein each computer card comprises:
    a frame;
    a printed circuit board mounted to the frame;
    a CPU comprised on the printed circuit board;
    a memory comprised on the printed circuit board;
    a non-volatile memory comprised on the frame;
    network interface logic comprised on the printed circuit board for interfacing to a network;
    human interface logic comprised on the printed circuit board which is operable to receive two or more human interface signals and encode the two or more human interface signals into a format suitable for transmission to a remote location;
    wherein the human interface logic is further operable to receive two or more encoded human interface signals from the remote location and decode the two or more encoded human interface signals from a format suitable for transmission from the remote location;
    a human interface connector coupled to the human interface logic, wherein the human interface connector is configured to couple to the one or more cables for communication of the encoded human interface signals with a remote location; and
    a power supply comprised on the frame, wherein the power supply is operable to couple to an external power source and supply power to the plurality of computing systems.

40. The system of claim 1, wherein the computer card contains a personal computer.

41. A system comprising a plurality of computing systems, the system comprising:
    a cage having a plurality of slots, wherein each of the slots is configured to receive a computer card;
    a plurality of computer cards, wherein each computer card comprises a respective computing system of the plurality of computing systems, wherein each computing system comprises a personal computer including a processor and a memory for executing at least one application program, and logic operable to encode signals for transmission to a respective remote location to communicate with a respective at least one human interface device at the remote location, wherein the remote location is more than 20 feet from the cage, wherein each personal computer comprised on each of the plurality of computer cards interfaces with a separate set of human interface devices, including at least a monitor and a keyboard, to provide personal computer functionality to a user of the separate set of human interface devices;
    a removable function module, wherein the removable function module is operable to electrically couple to the plurality of computer cards, wherein the removable function module is operable to provide additional functionality to each of the computer cards comprised in the slots of the cage.

* * * * *

UNITED STATES PATENT AND TRADEMARK OFFICE
CERTIFICATE OF CORRECTION

PATENT NO. : 7,069,368 B2  
APPLICATION NO. : 09/728669  
DATED : June 27, 2006  
INVENTOR(S) : Barry Thornton Page 1 of 1

It is certified that error appears in the above-identified patent and that said Letters Patent is hereby corrected as shown below:

In the Claims:

Column 22  
Line 65, please delete "a removeable function module" and substitute -- a removable function module --.

Column 22  
Line 67, please delete "the removeable function module" and substitute -- the removable function module --.

Signed and Sealed this

Twenty-first Day of November, 2006

JON W. DUDAS  
*Director of the United States Patent and Trademark Office*